(12) United States Patent
Miller et al.

(10) Patent No.: US 6,907,011 B1
(45) Date of Patent: Jun. 14, 2005

(54) QUIESCENT RECONFIGURATION OF A ROUTING NETWORK

(75) Inventors: Kevan Lee Miller, Danbury, CT (US); Robert Evan Strom, Ridgefield, CT (US); Daniel Charles Sturman, Englewood, NJ (US); Michael James Ward, New Haven, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,101

(22) Filed: Mar. 30, 1999

(51) Int. Cl.[7] .................. G01R 31/08; G06F 11/00; G08C 15/00; H04J 1/16; H04J 3/14; H04L 1/00; H04L 12/26

(52) U.S. Cl. .................. 370/254; 370/256; 370/412; 714/4

(58) Field of Search .................. 714/4; 370/241, 370/242, 252, 254–256, 351, 389, 394, 412, 428–429, 216; 709/200, 220–221, 223

(56) References Cited

U.S. PATENT DOCUMENTS

| | | | | |
|---|---|---|---|---|
| 5,138,615 A | * | 8/1992 | Lamport et al. | 370/400 |
| 5,257,369 A | | 10/1993 | Skeen et al. | 709/312 |
| 5,325,362 A | | 6/1994 | Aziz | 370/405 |
| 5,517,562 A | | 5/1996 | McConnell | 379/201.03 |
| 5,522,046 A | | 5/1996 | McMillen et al. | 709/239 |
| 5,555,244 A | | 9/1996 | Gupta et al. | 370/397 |
| 5,557,798 A | | 9/1996 | Skeen et al. | 705/35 |
| 5,570,366 A | | 10/1996 | Baker et al. | 370/312 |
| 5,581,764 A | | 12/1996 | Fitzgerald et al. | 709/223 |
| 5,604,867 A | | 2/1997 | Harwood | 709/233 |
| 5,870,605 A | * | 2/1999 | Bracho et al. | 719/318 |
| 6,333,929 B1 | * | 12/2001 | Drottar et al. | 370/362 |
| 6,336,119 B1 | * | 1/2002 | Banavar et al. | 707/104.1 |
| 6,396,814 B1 | * | 5/2002 | Iwamura et al. | 370/256 |
| 2003/0091049 A1 | * | 5/2003 | Abe et al. | 370/392 |

OTHER PUBLICATIONS

Hanson et al., "A Predicate Matching Algorithm for Database Rule Systems", Published at Proceedings of SIGMOD, pp. 271–280 (1991).

Mishra et al., "Consul: A Communication Substrate for Fault–Tolerant Distributed Programs", TR91–32, Department of Computer Science, The University of Arizona, pp 1–33 (Nov. 1991).

Smirnov, M.I. "Object–Oriented Framework for a Scalable Multicast Call Modeling", Teleservices and Multimedia Communications Second International COST 237 Workshop, Proceedings, Springer–Verlag, vii+277, pp. 1–39 (1996).

(Continued)

*Primary Examiner*—Seema S. Rao
*Assistant Examiner*—Kevin C. Harper
(74) *Attorney, Agent, or Firm*—Douglas W. Cameron, Esq.; Kevin P. Radigan, Esq.; Heslin Rothenberg Farley & Mesiti, P.C.

(57) ABSTRACT

Reconfiguration of a continuously available routing network of a publish/subscribe system is achieved by quiescing data messages and control messages within the routing network to preserve first-in first-out ordering thereof, and then, reconfiguring the quiesced routing network. This reconfiguration technique is particularly applicable to a routing network having at least one special node comprising one of a logger node or a sequencer node, wherein the logger node is used to store a message to persistent storage within the routing network prior to delivery of the message to one or more clients, and the sequencer sequences a message with other messages received by the network prior to delivery thereof for ordered delivery of the messages to one or more clients of the network.

34 Claims, 11 Drawing Sheets

| | |
|---|---|
| RECONFIG_ROOT | TRUE/FALSE |
| QUIESCING | TRUE/FALSE |
| CONFIGURE_RECEIVED | TRUE/FALSE |
| QUIESCE_MSG_QUEUE | FIFO QUEUE |
| QUIESCING_CHILDREN | No. |

OTHER PUBLICATIONS

Hofmann, M. "A Generic Concept for Large–Scale Multicast", Broadband Communications, Network, Services Applications, Future Directions, International Zurich Seminar on Digital Communications, IZS '96, Proceedings, Springer–Verlang, xiv+358, pp. 95–106 (1996).

Zabele et al., "High Performance Infrastructure For Visually–Intensive CSCW Applications", Transcending Boundaries CSCW '94, Proceedings of the Conference on Computer Supported Cooperative Work, ACM, xi+464, pp. 395–403 (Oct. 1994), Abstract Only.

K.P. Birman, "The Process Group Approach to Reliable Distributed Computing", Communications of the ACM, vol. 36, No. 12 (Dec. 1993), pp. 37–53.

Oki et al., "The Information Bus—An Architecture for Extensible Distributed Systems", SIGOPS '93, ACM 0–89791–632–8/93/0012, (1993), pp. 58–68.

D. Powell, "Group Communication", Communications of the ACM, Vo. 39, No. 4; (Apr. 1996), pp. 52–100.

M.I. Smirnov, "Efficient Multicast Routing in High Speed Networks", In Comput Commun. (UK), vol. 19, No. 1, Elsevier, (Jan 1996), pp. 59–75, 45 Ref., Abstract Only.

M. Grossglauser, "Optimal Deterministic Timeouts for Reliable Scalable Multicast", 0743–166X/96, 1996 IEEE, pp. 1425–1432.

* cited by examiner

US 6,907,011 B1

QUIESCENT RECONFIGURATION OF A ROUTING NETWORK

CROSS-REFERENCE TO RELATED APPLICATIONS

This application contains subject matter which is related to the subject matter of the following United States patent applications, which are assigned to the same assignee of this application. Each of the below-listed applications is hereby incorporated herein by reference:

"Routing Messages Within A Network Using The Data Content Of The Message," by Chandra et al., filed Nov. 20, 1997, Ser. No. 08/975,303;

"Message Logging For Reliable Multicasting Across A Routing Network," by Banavar et al., Ser. No. 09/281,421, filed Mar. 30, 1999;

"Message Sequencing For Ordered Multicasting Of A Message Across A Routing Network," by Banavar et al., Ser. No. 09/280,530, filed Mar. 30, 1999, now U.S. Pat. No. 6,760,340;

"Non-Disruptive Reconfiguration Of A Publish/Subscribe System," by Miller et al., Ser. No. 09/280,534, filed Mar. 30, 1999, now abandoned.

TECHNICAL FIELD

This invention relates in general to reconfiguration of a routing network and, in particular, to quiescently reconfiguring a routing network having one or more special nodes for facilitating reliable delivery or ordered delivery of messages within the routing network using logging or sequencing techniques employing the special node(s).

BACKGROUND OF THE INVENTION

Many network environments enable messages to be forwarded from one site within the network to one or more other sites using a multicast protocol. Typical multicast protocols send messages from one site to one or more other sites based on information stored within a message header. That is, each message has two components: the message header, which includes the routing information, including destination addresses or a predefined group name that is associated with a fixed list of destinations, and a data content, which is the data of the message. The routing information is read from the message header and is used to send the data content of the message to the specified destinations.

One example of a system that conventionally includes such a network environment is a publish/subscribe system. In publish/subscribe systems, publishers post messages and subscribers independently specify categories of messages in which they are interested. The system takes the posted messages and includes in each message header the destination information of those subscribers indicating interest in the particular message. The system then uses the destination information in the message to forward the message through the network to the appropriate subscribers.

More particularly, a publish/subscribe system includes a network of message routers (or simply routers or nodes) connected via links in an arbitrary graph topology. A number of clients connect to the periphery of this router network and either publish or subscribe to messages. A message includes of a number of attributes, which are name-value pairs. A subscription specifies a predicate on the attributes of messages.

The problem addressed by the present application is how to handle changes of topology in such a routing network. The need for changing topology arises from a number of conditions, including: (1) the need for system maintainers to move routers on- and off-line; (2) the growth of the network; and (3) changes in link speed that alter the optimum spanning trees of the network; etc. An assumption is made that a configuration manager has made a decision to effect a particular topology change (i.e., a reconfiguration). The present invention is directed to a technique by which nodes of the router network execute a reconfiguration decision, eventually resulting in a new state of the network in which messages are forwarded using a new spanning tree.

DISCLOSURE OF THE INVENTION

Briefly summarized, the present invention comprises in one aspect a method for reconfiguring a routing network. The method includes: quiescing the routing network to preserve a first-in first-out ordering of data messages within the routing network; and reconfiguring the quiesced routing network. As an enhancement, the method further includes the quiescing of control messages within the routing network prior to the reconfiguring, and the routing network comprises a special network having at least one logging node or a sequencing node wherein messages are either logged to persistent storage for reliable routing or sequenced with other messages received by the network for ordered delivery.

In another aspect, the invention comprises a system for reconfiguring a routing network. The system includes means for quiescing the routing network to preserve a first-in first-out ordering of data messages within the routing network, and means for thereafter reconfiguring the quiesced routing network.

In still another aspect, a system for reconfiguring a publish/subscribe system is provided. This reconfiguration system includes a routing network adapted to receive published messages for forwarding to subscribers. The network is further adapted to quiesce data messages and control messages within the network in response to a reconfigure command to preserve a first-in first-out ordering of data messages and control messages within the routing network, and to then reconfigure the routing network once data messages and control messages have been quiesced.

In a further aspect, the invention comprises an article of manufacture which includes at least one computer usable medium having computer readable program code means embodied therein for effecting reconfiguring of a routing network.

The computer readable program code means in the article of manufacture includes: computer readable program code means for causing a computer to effect quiescing the routing network to preserve a first-in first-out ordering of data messages within the routing network; and computer readable program code means for causing a computer to effect reconfiguring the quiesced routing network.

To restate, provided herein is a technique for quiescent reconfiguration of a routing network of a publish/subscribe system without loss of messages. Reconfiguration is dynamic in that it is accomplished without shutting down the network, i.e., the execution of a reconfiguration is not directly visible to either publishers or subscribers. The publishers and subscribers continue to publish and receive messages as if no reconfiguration is taking place or has taken place. As used herein, quiescent means that it is only necessary to temporarily suspend message traffic within the routing network before reconfiguring the network and resuming message traffic. The quiescent reconfiguration technique presented has particular application in large, continuously available broker networks in which change and evolution are inevitable and service disruption is not tolerable. Although principally described below in connection with a content-based routing network, the reconfiguration approach can be applied to other routing systems, e.g., subject-based routing systems.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

In one aspect, the present invention can be employed in a system using the routing capability disclosed in the above-incorporated application wherein messages are routed in a network based on the content of the data within the message. With data-content routing, a message does not need to include destination information, such as destination addresses or a group destination name. Instead, data within the message is used to traverse a data structure to determine the link or links over which the message is to be forwarded in order to reach the consumers (subscribers or clients) interested in the message.

More particular to the present invention, a quiescent reconfiguration technique is provided for, for example, such a content-based multicasting network. Further, the quiescent reconfiguration technique presented herein may be used in combination with, or separately from, the "reliable routing capability" and the "total ordering capability" described in the above-incorporated, co-filed patent applications. Whether used in combination with reliable routing or ordered delivery, or separately therefrom, quiescent reconfiguration in accordance with the principles of this invention may also be used with the above-described content-based routing network. However, those skilled in the art will recognize that the reconfiguration technique presented below is equally applicable to other routing systems, such as a subject-based routing system. One assumption underlying the reconfiguration technique is that links within the routing network propagate messages in a reliable first-in first-out manner.

Figure 1:
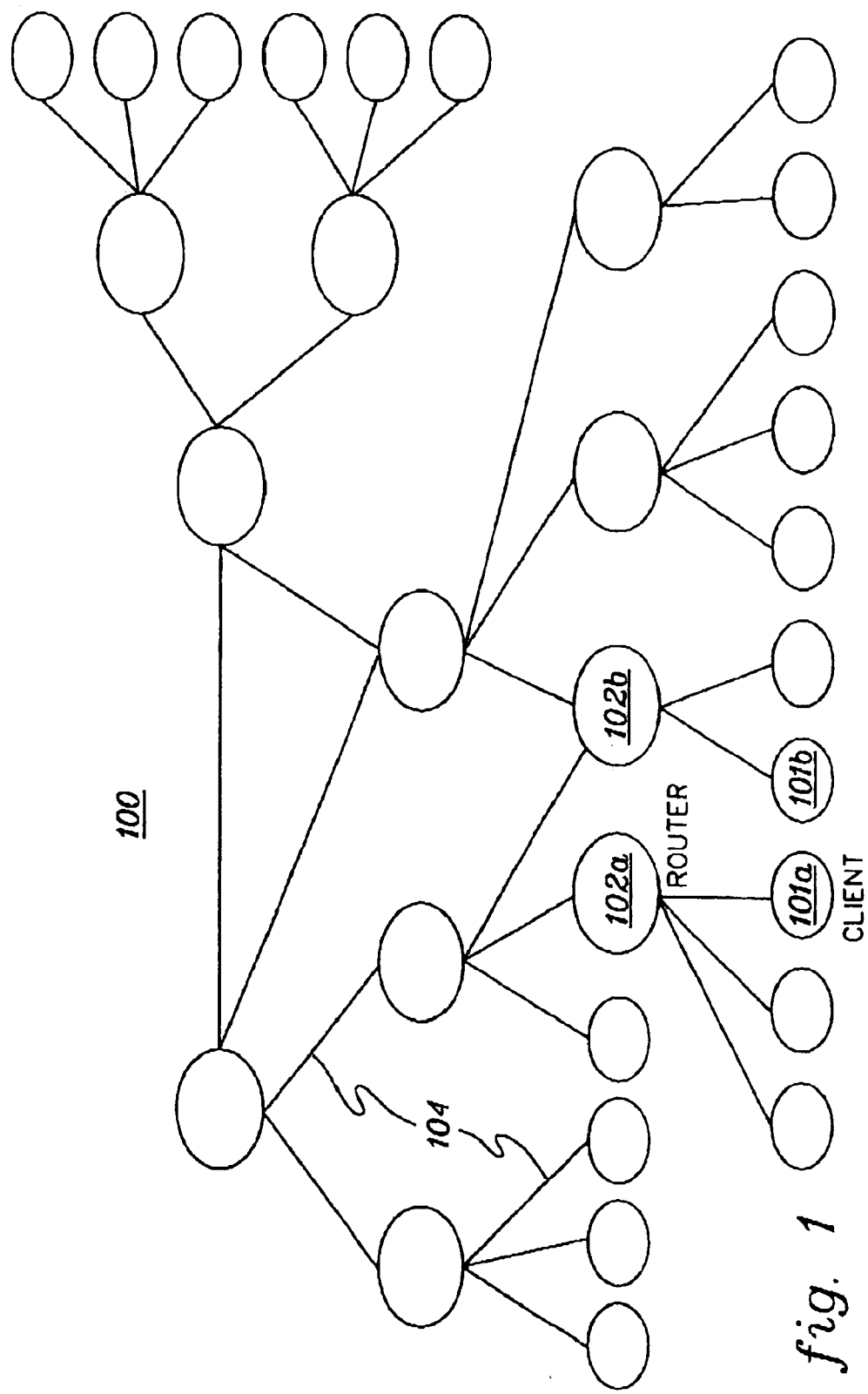
FIG. 1 depicts one example of a distributed network incorporating and using the quiescent reconfiguration capability of the present invention.

One example of a distributed network 100 incorporating and using the quiescent reconfiguration capability of the present invention is depicted in FIG. 1 and described in detail below. Network 100 includes, for instance, a plurality of computing units 102 coupled to one another by links 104.

Each link couples two computing units in the network, and each computing unit may have any number of links connected to it. Each link is bidirectional, i.e., a computing unit may send and receive messages on the link. Each link is also connection oriented, i.e., the computer units at the ends of the link are notified when the link fails. Furthermore, each link propagates messages in a first-in first-out manner. Each computing unit in the network is either a client computer (represented by the smaller ovals, such as those having addresses 101a, 101b), meaning that it either originates messages or has requested to receive messages whose content satisfies certain properties; or it is a router computer (represented by the larger ovals, such as 102a, 102b), meaning that it forwards is messages received on one network link onto other links on the way to the client computer(s). The clients are collectively referred to herein as clients 101 and the routers are collectively referred to as routers 102. (For purposes of this discussion, if a single computing unit serves both as a router and as a client, these two separate functions will be considered as two computing units connected by a link.)

Each computing unit can be any type of computing unit that can be included in a network. For example, it can be an RS/6000 computing node or any other of various types of computing nodes, processors, computers or systems. The network can also include different types of computing units coupled to one another via the links. The links include, for instance, TCP connections over IP links, as only one example.

Distributed network 100 can be included in various systems that require the passing of messages or data. These systems include, for instance, the Internet or publish/subscribe systems (such as the above-summarized content-based messaging system).

Content-based publish/subscribe systems improve the degree of decoupling between publishers and subscribers. In content-based publish/subscribe systems, subscriptions are specified in terms of predicates on the posted data, rather than in terms of subject identifiers supplied by the publisher. One example of a content-based publish/subscribe system is described in co-pending U.S. patent application Ser. No.

08/975,280, entitled "Method And System For Matching Consumers To Events," Astley et al., which is hereby incorporated herein by reference in its entirety. The examples described herein are with reference to a content-based subscription system. However, these are only examples. The present invention can be employed with other types of systems without departing from the spirit of the present invention.

In one embodiment of the invention, each router 102 of network 100 (FIG. 1) has associated therewith a spanning tree, which lays out the best path (according to some criterion, such as latency) from the router to each client 101. In this embodiment, it is assumed that routers agree on a common criterion for measuring distance between nodes in the network. There may in fact be multiple spanning trees. For example, alternative spanning trees may specify either backup routes, or peak load routes. Herein, it is assumed that one spanning tree is initially in effect for the routing of any particular message.

Figure 2:
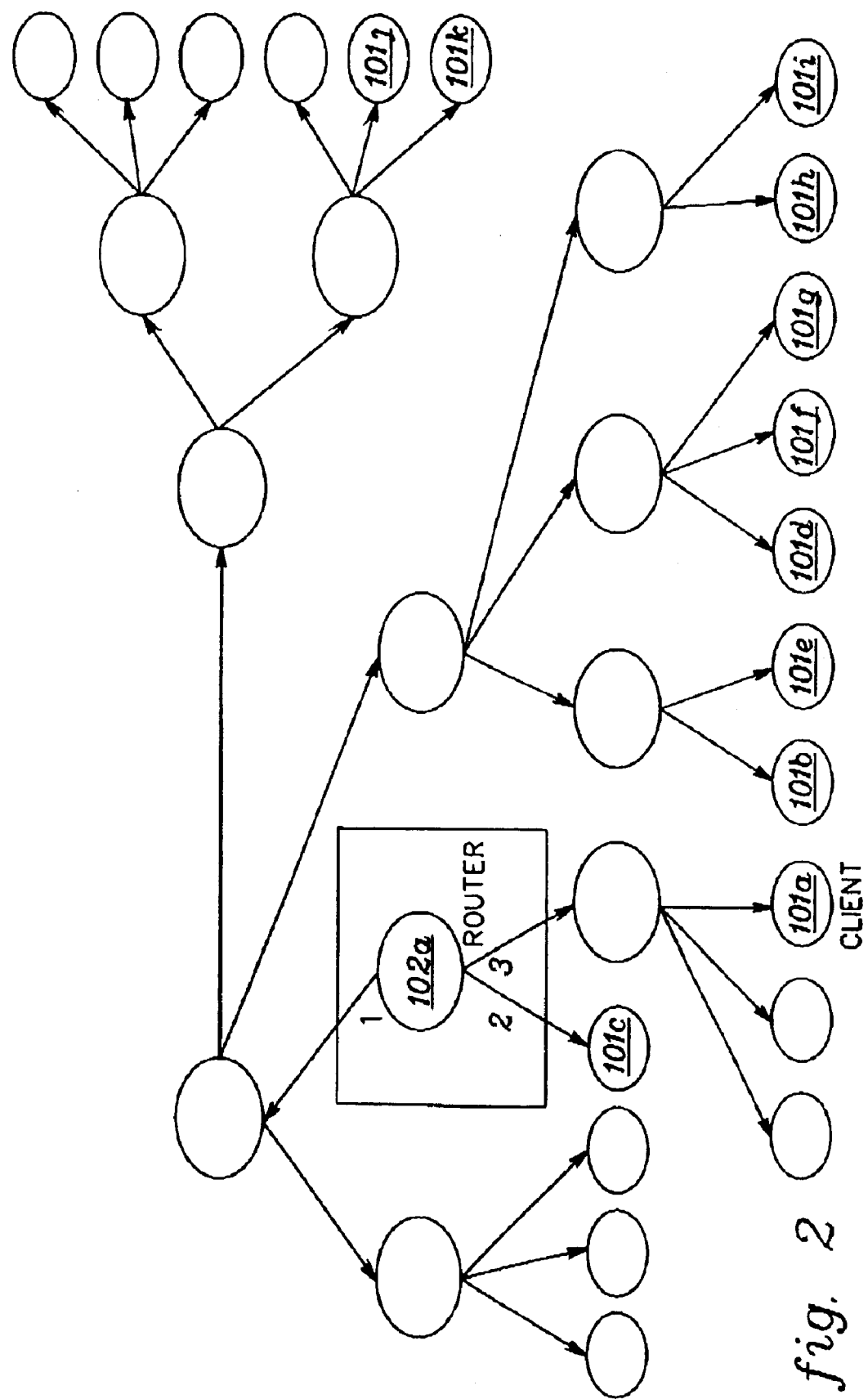
FIG. 2 depicts one example of a spanning tree used in accordance with the principles of the present invention.

One example of a spanning tree, which is associated with a router is depicted in FIG. 2. As shown in FIG. 2, there is a path from a router 102a to every other node in the spanning tree. A message to be routed from router 102a to one or more of the other nodes is routed via one or more of the links associated with router 102a, i.e., links 1–3. For example, if a message is to be routed from node 102a to node 101c, then link 2 is used. As a further example, if a message is to be forwarded toward client 101a, then link 3 is used.

One embodiment for building a spanning tree from a network topology, that is an arbitrary graph, is described in detail in *Introduction to Algorithms*, by Cormen, Leiserson, Rivert, Chapter 24, pp 498–513, Published by MIT Press (1990), which is hereby incorporated herein by reference in its entirety.

In addition to the spanning tree associated with each router, each router has a routing table. The routing table includes an entry for each client computer in the network. Each entry of the routing table associates a client address with the identifier of the network link constituting the next segment on the path in the spanning tree from the router to the client. For a router with d network links, each such link identifier is an integer between 1 and d. For instance, the client having address 101a has a corresponding link identifier of 3 (see FIG. 2).

Each routing table is constructed via information from the network topology (e.g., the client addresses) and hence from the corresponding spanning tree (e.g., the link identifiers), in a known manner.

Figure 3:
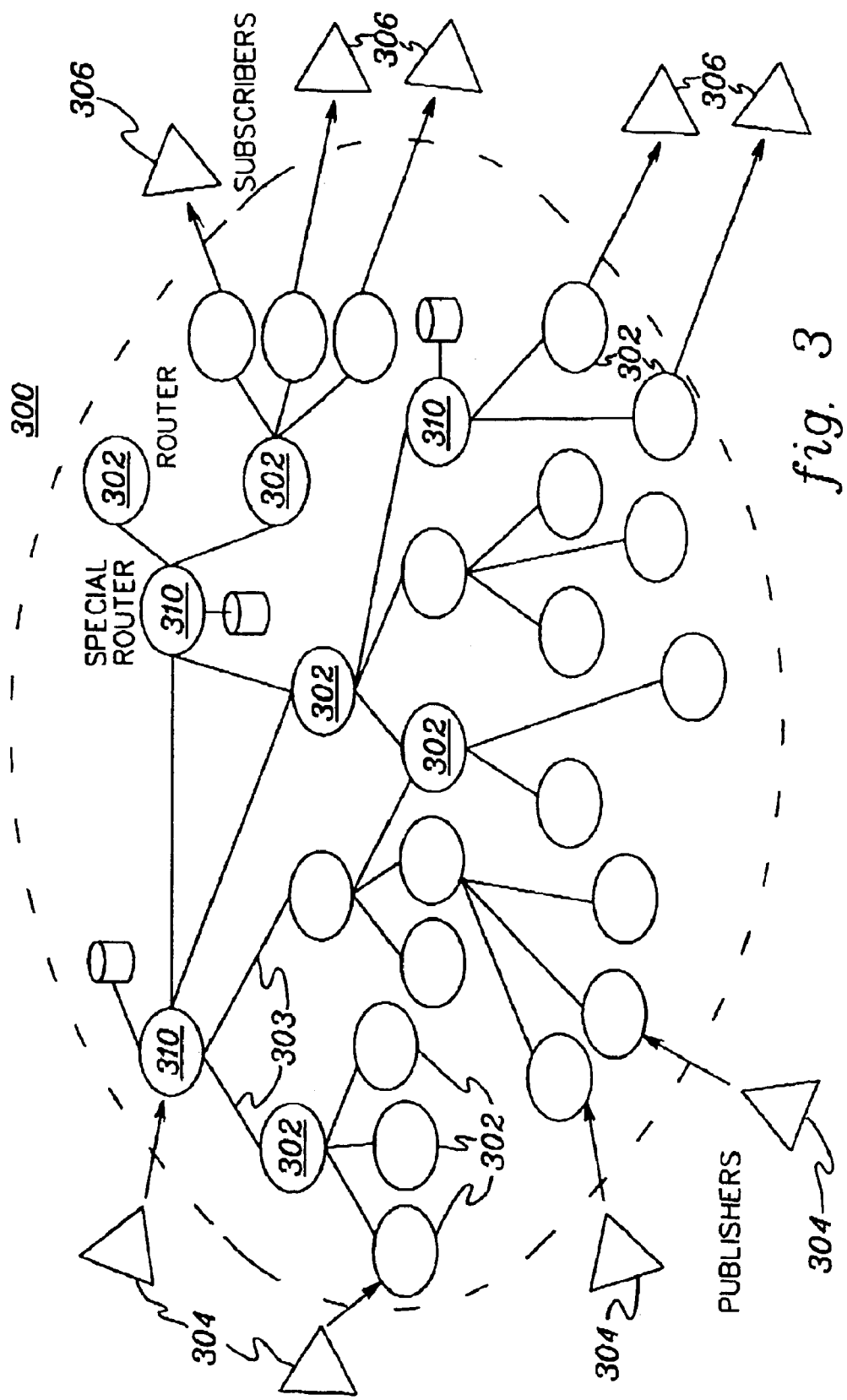
FIG. 3 depicts one embodiment of a distributed router network, configured with resilient or ordered routing capability, which is to undergo quiescent reconfiguration in accordance with the present invention.

By way of example, FIG. 3 depicts one embodiment of a publish/subscribe system, generally denoted 300, to employ quiescent reconfiguration in accordance with the principles of the present invention. System 300 includes a network of routers 302 connected via links 303 in an arbitrary graph topology. A number of clients connected to the periphery of this router network either publish messages or subscribe to messages. Those clients publishing messages comprise publishers 304, while those clients subscribing to messages comprise subscribers 306. The router network is responsible for routing messages from a publisher 304 to interested subscribers 306 based on matching messages to subscription predicates.

Again, this protocol (i.e., content-based routing) is described in detail in the initially-incorporated co-pending patent application entitled "Routing Messages Within A Network Using The Data Content Of The Message." As noted, from each router node at which a publisher is present, the system computes and stores a spanning tree to reach every other node in the network. All published messages from the publisher follow the paths in that spanning tree, with each router node performing enough matching to determine which of its child routers should receive the message.

Within a publish/subscribe system, the present invention can be employed, in one example, with a network achieving reliability of routed messages by saving messages to persistent storage within the network (and then retrieving and redelivering the message whenever there is a failure in the network). Such a reliable routing network is described in the above-incorporated, co-filed patent application entitled "Message Logging For Reliable Multicasting Across A Routing Network." In accordance with that invention, publishers and subscribers that need reliability of messages may specify a quality of service parameter, e.g., "uniform delivery". Uniform delivery is provided for ensuring delivery of a message to all active subscribers notwithstanding failure in the network, e.g., the routers, or the links. One or more special routers in the router network 300 are designated logging node(s) or logger(s) 310 and support the ability to log messages to stable storage. When there is at least one subscriber needing logging, the routing algorithm ensures that messages are routed to the logger.

Alternatively, or in further combination, the present invention can be employed in another example with a network achieving ordering of routed messages by sequencing messages within the router network itself through assignment of a sequence number at a designated sequencing node of the network. Publishers and subscribers that need ordering of messages may specify a quality of service parameter called "totally ordered". Total ordering is provided for ensuring ordered delivery of a message to all active subscribers. Such message sequencing within the router network is described in the above-incorporated, co-filed application entitled "Message Sequencing For Ordered Multicasting Of A Message Across A Routing Network." When employing sequencing, a special router 310 in the router network 300 is designated a sequencing node or sequencer. Node 310 supports the ability to sequence messages received into the routing network. When there is at least one subscriber needing total ordering, the routing algorithm guarantees that messages are routed to the sequencer.

To summarize, quiescent reconfiguration pursuant to the present invention can be employed in a router network of a publish/subscribe system which utilizes at least one special node to facilitate either, or both, logging of messages or sequencing of messages with the network itself.

Figures 4, 5:
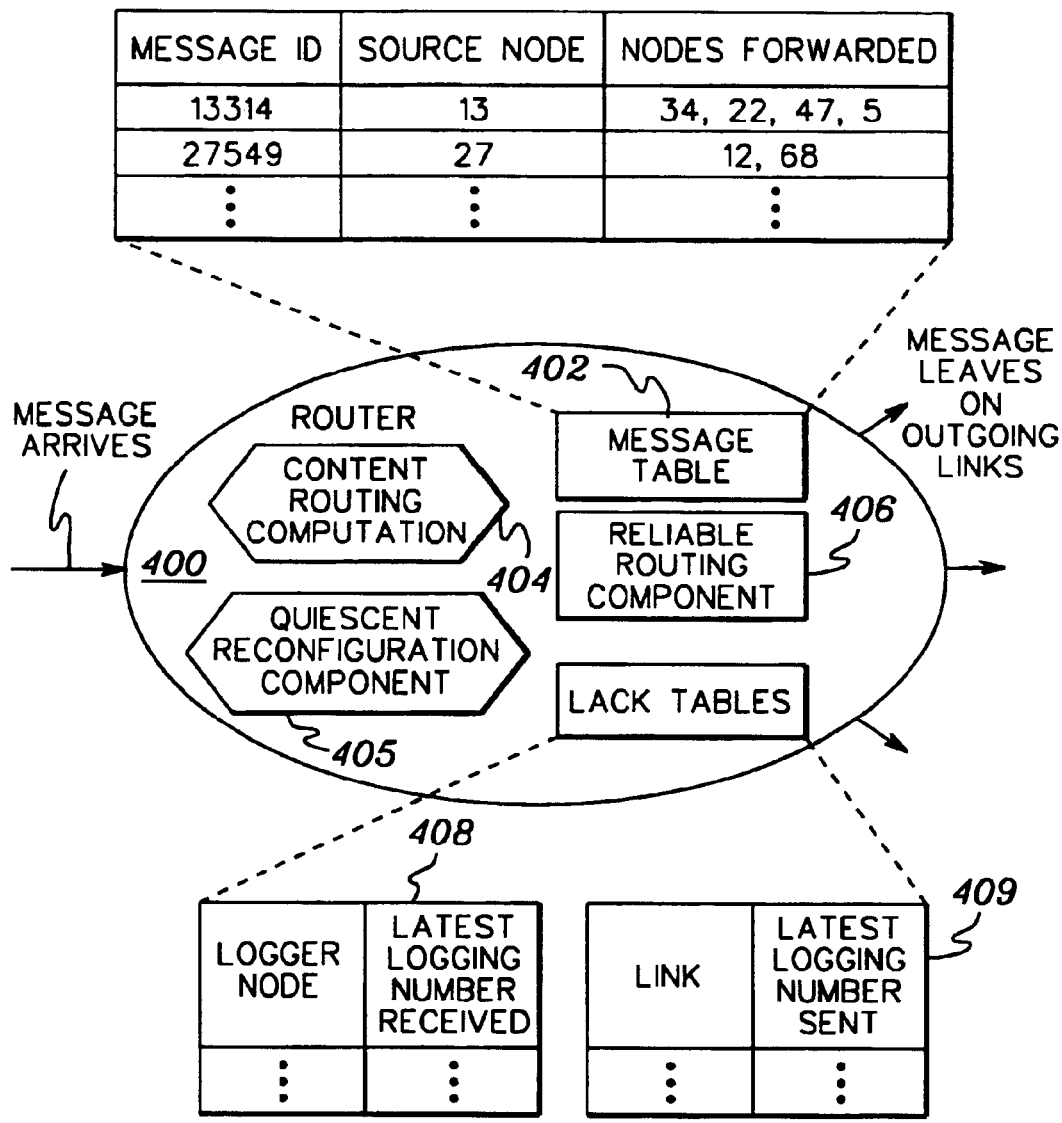
FIG. 4 depicts one embodiment of a router for use in accordance with the principles of the present invention in a router network such as depicted in FIG. 3.
FIG. 5 depicts one example of an information table for routers of a network employing quiescent reconfiguration in accordance with the principles of the present invention.

FIG. 4 depicts one embodiment of a router node for use in accordance with the principles of the present invention. When a message arrives at router 400 it is stored into a message table 402 using a unique message identifier. Information stored includes a source node identification as well as the neighboring nodes to which the message is to be forwarded. These neighboring nodes are calculated by a content routing computation component 404 after the message has been received. Computation component 404 takes the message and, based upon stored subscriptions and the spanning tree, returns a set of destinations or links upon which the message should be forwarded. Again, in one embodiment, this computation is content dependent and can be accomplished as described in the above-incorporated co-pending application. However, this component can be implemented in other ways, e.g., subject-based routing. In one embodiment, to facilitate reliable routing of messages, router 400 would also include a reliable routing component 406 and logging acknowledgment (LACK) received table 408 and LACK send table 409, which are described in the above-incorporated, co-filed application entitled "Message Logging For Reliable Multicasting Across A Routing Network."

If ordered routing of messages is employed, then router 400 would also include recovery data, including a latest sequence number received and linked node tables (not shown) such as described in the above-incorporated, co-filed application entitled "Message Sequencing For Ordered Multicasting Of A Message Across A Routing Network." Again, the quiescent reconfiguration approach of this invention can be employed in a routing network of a publish/subscribe system employing data content messaging, reliable routing of messages, or sequencing of messages, either individually or in combination.

Quiescent reconfiguration requires the entire routing network to be quiesced before the network is reconfigured and network operations are resumed. Since the network is quiesced before it is reconfigured, first-in first-out (FIFO) ordering is preserved between all nodes. In accordance with this invention, once quiesced, a node may not publish any new messages from one or more clients thereof. However, a quiesced node must continue to route any data messages or control messages which it receives from other nodes of the network.

In one embodiment, the following messages are used to quiesce a network in accordance with the present invention.

QUIESCE—sent by the root of a configuration change to initiate quiescence of data messages.

CONFIGURE—sent by a configuration manager and nodes in the network to change a spanning tree used to route messages in the network.

QUIESCE_ACK—sent by a node to acknowledge receipt of a QUIESCE message. Once a QUIESCE_ACK has been sent, a node cannot forward messages from clients into the routing network any new data messages for transmission across the network.

However, it must continue to route all data and control messages sent by other nodes in the network.

QUIESCE_SPECIAL—sent by a root to quiesce a special node, such as a logging node or a sequencing node. The special node responds with a QUIESCE_SPECIAL_ACK message.

QUIESCE_COMPLETE—sent by the root to indicate that all nodes have been quiesced and the new configuration may be resumed.

An overview of the algorithm for quiescing and reconfiguring a broker network is given next. First, a decision is made to reconfigure the broker network. This decision is outside of the scope of this description. This description assumes that a CONFIGURE message is communicated to a node in the network which becomes the root of the configuration change. For example, a Configuration Manager (described below) under control of some administrator might calculate a new configuration for the network and send a CONFIGURE message to the root. Parent and child nodes are defined in relationship to this root node.

In one embodiment, quiescent reconfiguration in accordance with this invention can then proceed in three phases. First, data messages within the network are quiesced. Second, control messages (protocol messages used by special nodes, i.e., loggers and sequencers, e.g., LACK/SACK messages) are quiesced. Third, the network is reconfigured. These phases are summarized below.

Data Message Quiescence

The root node initiates quiescence by sending a QUIESCE message to all child nodes thereof using the existing configuration. When a node receives a QUIESCE message, the node begins queueing new data messages received from its clients, forwards the QUIESCE message to all child nodes, and sends a QUIESCE_ACK to its parent. QUIESCE_ACK messages may be coalesced at each level (i.e., a parent may wait to receive QUIESCE_ACKs from all of its children before sending its own QUIESCE_ACK to its parent), or all QUIESCE_ACK messages may be forwarded to the root node. Once quiesced, a node does not forward any new data messages from clients thereof. However, the node continues to forward data and control messages received from neighboring nodes (parents and children). Also, a logging/sequencing node continues to produce LACK/SACK messages in response to data messages which it receives.

Once the root node has received a QUIESCE_ACK message from all nodes, from the root's perspective, all data messages have been quiesced, and there can be no data messages flowing through the network towards the root. However, there may be data messages flowing away from the root node. Also, there may be SACK and LACK messages flowing towards and away from the root node.

Control Message Quiescence

The root node next quiesces LACK/SACK messages in the network. Using the same quiesce technique outlined above, the root node sends QUIESCE_SPECIAL messages to any children sequencers and loggers. Note that if the root node is the only special node in the network, the control message quiescence phase is not necessary. When a logger/sequencer receives a QUIESCE_SPECIAL message, the node will not receive any new data messages on the current configuration. When all LACK/SACK messages to any previous data messages have been sent, the logging/sequencing node sends a QUIESCE_SPECIAL_ACK to the root node. After a logger/sequencer node has been quiesced, the node continues to forward any control messages received from neighboring nodes (parent and children).

Once the root has received a QUIESCE_SPECIAL ACK message from all logger/sequencer nodes, then from the root's perspective, all control messages have been quiesced and there are no control messages flowing through the network towards the root node. However, there may still be data and control messages flowing away from the root node.

Reconfiguration

The root next informs all nodes that the network has been quiesced and proceeds to reconfigure the network. First, the root node sends a QUIESCE_COMPLETE to all nodes using the existing configuration. Because links between nodes are FIFO, the QUIESCE_COMPLETE message is guaranteed to be the last message in the existing configuration, i.e., no data or control message can follow the QUIESCE_COMPLETE message. Next, the root of the new configuration (if different from the old root, the old root would have to send a message to the new root), sends a CONFIGURE message to all nodes using the new configuration. When a node receives a CONFIGURE message, the node forwards the message to all of its downstream nodes in the new configuration. If a node receives a CONFIGURE message before it has received a QUIESCE_COMPLETE message on the previous configuration, the node must wait for the QUIESCE_COMPLETE before processing any new messages received on the new configuration. Waiting for the QUIESCE_COMPLETE message insures that all data and control messages have been received on the old configuration. Once a QUIESCE_COMPLETE message is received, any resources allocated for the previous configuration are no longer needed and may be freed.

One detailed embodiment of quiescent reconfiguration in accordance with the present invention is described below with reference to FIGS. 5–12. FIG. 5 depicts one example of additional information employed at the routers of a network to use quiescent reconfiguration in accordance with this invention. For example, the table of FIG. 5 could be associated with or incorporated within the quiescent reconfiguration component 405 of the router of FIG. 4. This table includes (in one example) entries for five variables, labeled RECONFIG_ROOT, QUIESCING, CONFIGURE_RECEIVED, QUIESCE_MSG_QUEUE, and QUIESCING_CHILDREN. Each of these variables is described below in connection with the flowchart process of FIGS. 6–12.

Figure 6:
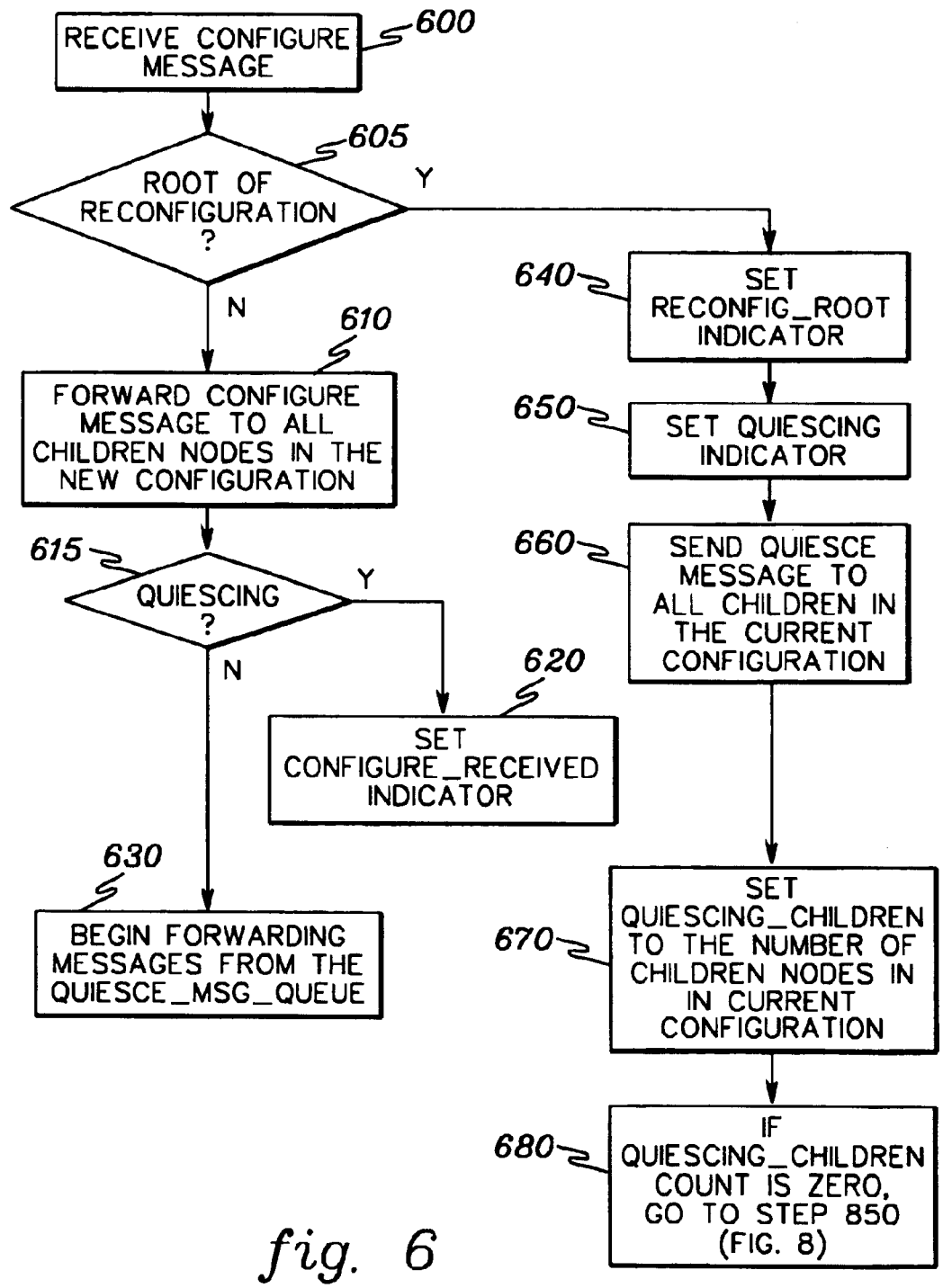
FIG. 6 is a flowchart of one embodiment of CONFIGURE message processing in accordance with the principles of the present invention.

FIG. 6 depicts one embodiment for processing a CONFIGURE message received, for example, from a configuration manager. As noted above, an assumption is made that the configuration manager independently makes the decision to effect a particular topology change, i.e., a reconfiguration. A configuration manager is a "network system service" that is responsible for maintaining information about the structure, function and status of a network system. This includes information such as the network topology, nodes with certain properties (such as loggers, sequencers), quality of service offered by nodes in the network, etc. A system's configuration may be statically fixed or dynamically changing. A configuration manager may be centralized or distributed. Network system management products such as IBM's Tivoli TME-10 contain configuration management components. Again, from the perspective of the current invention, a CONFIGURE message is assumed to be received from the configuration manager. The present invention is directed to a technique by which reconfiguration is transparent to the publishers and subscribers of the network, particularly where the network employs a special logging or sequencing node as described above.

Referring to FIG. 6, processing commences with receipt of a CONFIGURE message 600 within the network. With receipt of this message, the node determines whether it is the root of the reconfiguration 605. If "no", then the CONFIGURE message is forwarded to all children nodes in the new configuration 610, and the node determines whether the QUIESCING state is true 615. If "yes", then the CONFIGURE_RECEIVED indicator is set 620. Otherwise, the reconfiguration is complete and the node begins forwarding messages from its message queue (QUIESCE_MSG_QUEUE) using the new spanning tree 630.

Returning to inquiry 605, if the node is the root of the reconfiguration, then the node's RECONFIGURE_ROOT indicator is set 640, as well as the QUIESCING indicator 650. A QUIESCE message is sent to all children in the current configuration 660 and the QUIESCING_CHILDREN indicator is set to the number of children nodes in the current configuration 670. If the QUIESCING_CHILDREN count is zero 680, then processing jumps to step 850 of FIG. 8 (described below).

Figure 7:
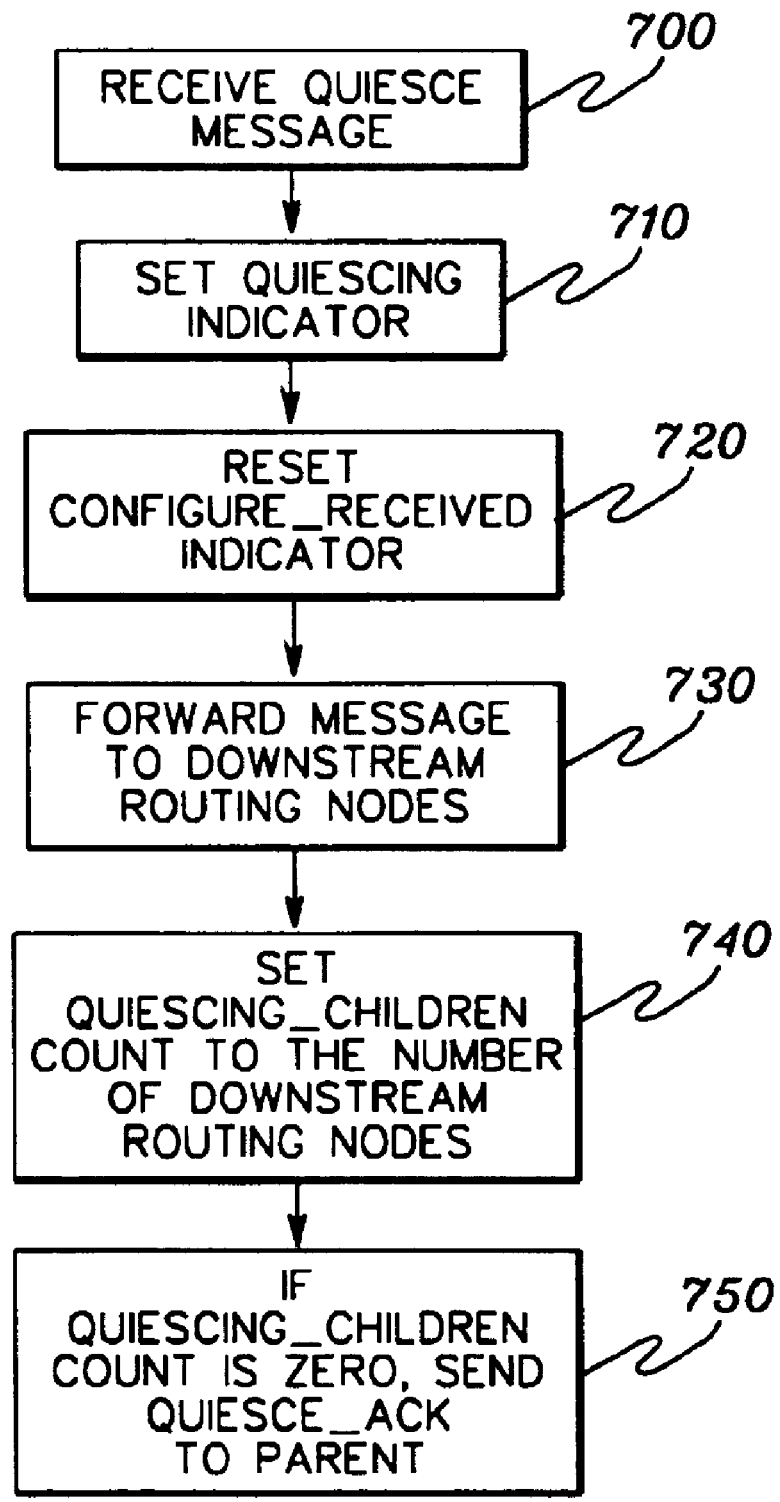
FIG. 7 is a flowchart of one embodiment of QUIESCE message processing in accordance with the principles of the present invention.

FIG. 7 is a flowchart of one embodiment for QUIESCE message processing in accordance with the present invention. When a node receives a QUIESCE message 700, the node's QUIESCING indicator 710 is set, and the CONFIGURE_RECEIVED indicator is reset 720. The QUIESCE message is forwarded to downstream routing nodes 730 and the QUIESCE_CHILDREN count is set to the number of downstream routing nodes 740. If the QUIESCE_CHILDREN count is zero, then the QUIESCE_ACK message is returned to the node's parent node 750.

Figure 8:
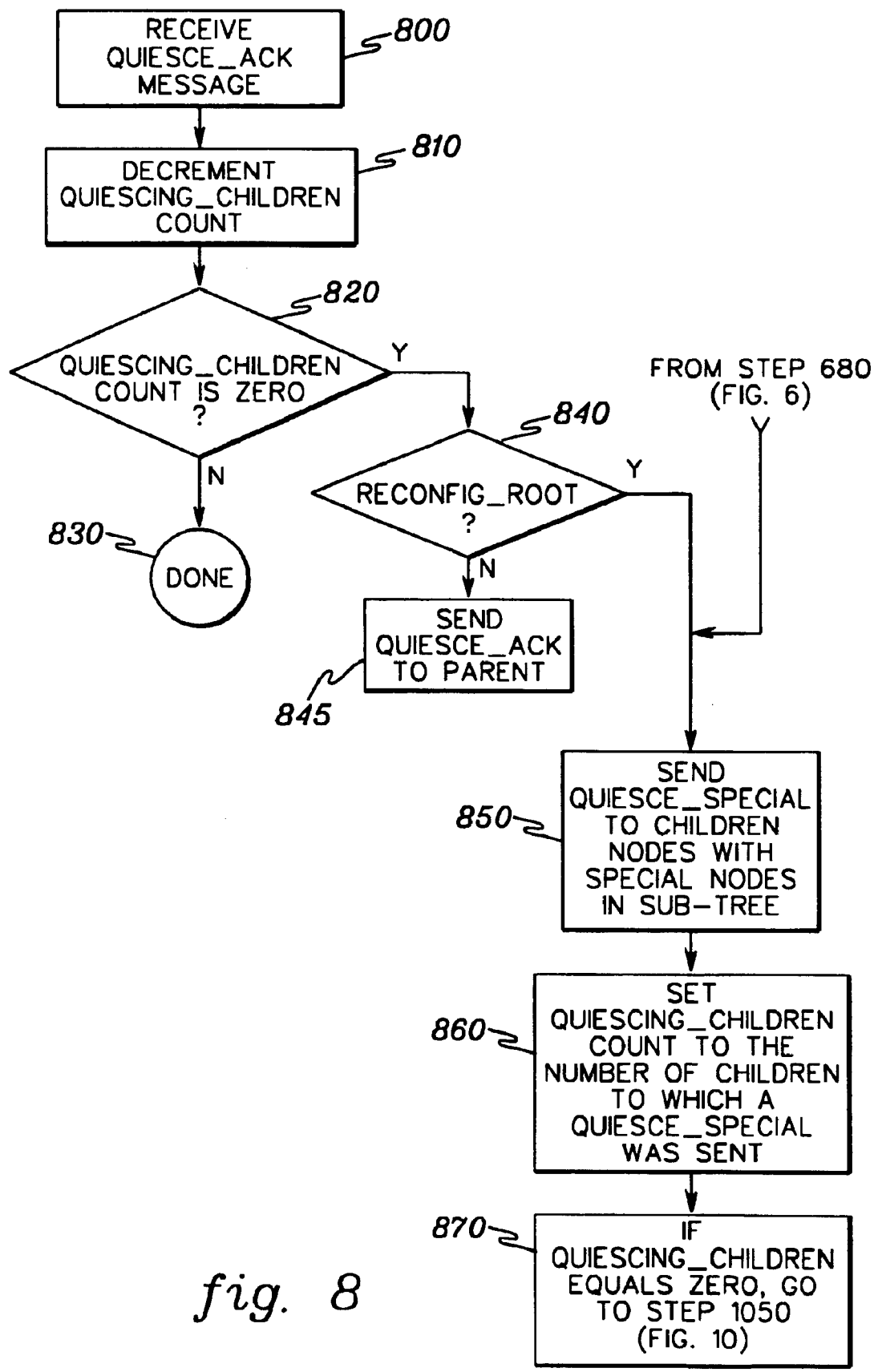
FIG. 8 is a flowchart of one embodiment of QUIESCE_ACKNOWLEDGE message processing in accordance with the principles of the present invention.

One embodiment for processing (pursuant to the present invention) a QUIESCE_ACK message is depicted in FIG. 8. Upon receipt of a QUIESCE_ACK message 800 at a node, the node's QUIESCING_CHILDREN count is decremented 810 and the node determines whether the QUIESCING_CHILDREN count is zero 820. If "no", then (in this embodiment) the node awaits further QUIESCE_ACK messages, meaning that the current processing is done 830.

Once all children have responded with a QUIESCE_ACK message, the node determines whether it is the reconfiguration root 840. If "no", the node sends a QUIESCE_ACK to it parent node 845. If the node is the root node for the reconfiguration, then the node sends a QUIESCE_SPECIAL message to its children nodes having a special node in its sub-tree 850. Also, note from FIG. 8, that if the QUIESCING_CHILDREN count is zero in step 680 of FIG. 6, then processing jumps to instruction 850. After sending the QUIESCE_SPECIAL message, the node sets the QUIESCING_CHILDREN count to the number of children to which the QUIESCE_SPECIAL message was sent 860. If the QUIESCING_CHILDREN count equals zero 870, then processing goes to step 1050 of FIG. 10.

Figure 9:
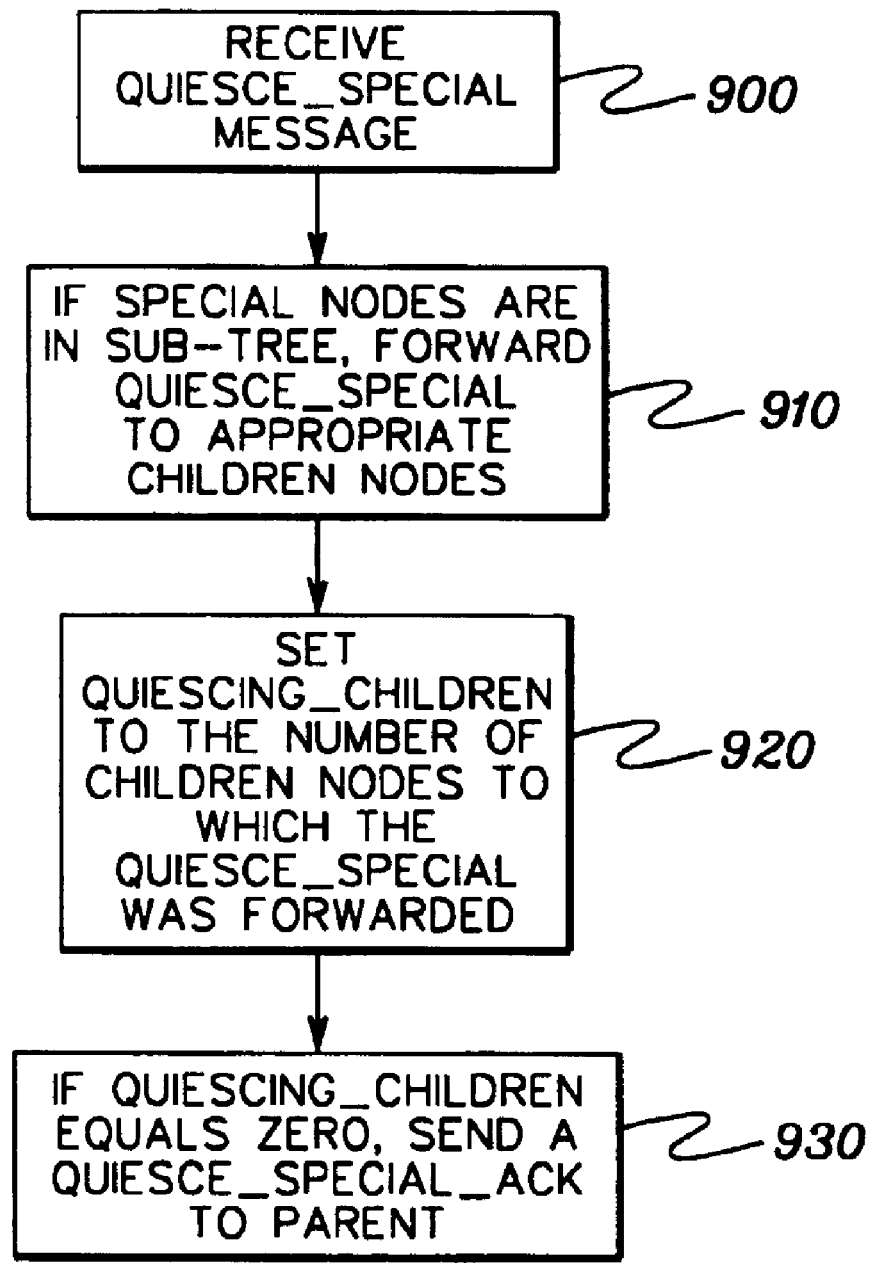
FIG. 9 is a flowchart of one embodiment of QUIESCE_SPECIAL message processing in accordance with the principles of the present invention.

FIG. 9 depicts a node's processing of a QUIESCE_SPECIAL message in accordance with the present invention. After a QUIESCE_SPECIAL message is received at a node 900, the node forwards the message to appropriate children nodes if a special node exists in a sub-tree from that node 910. The QUIESCING_CHILDREN indicator is set to the number of children nodes to which the QUIESCE_SPECIAL message is forwarded 920. If the QUIESCING_CHILDREN indicator equals zero, then a QUIESCE_SPECIAL_ACK message is returned to the node's parent node 930.

Figure 10:
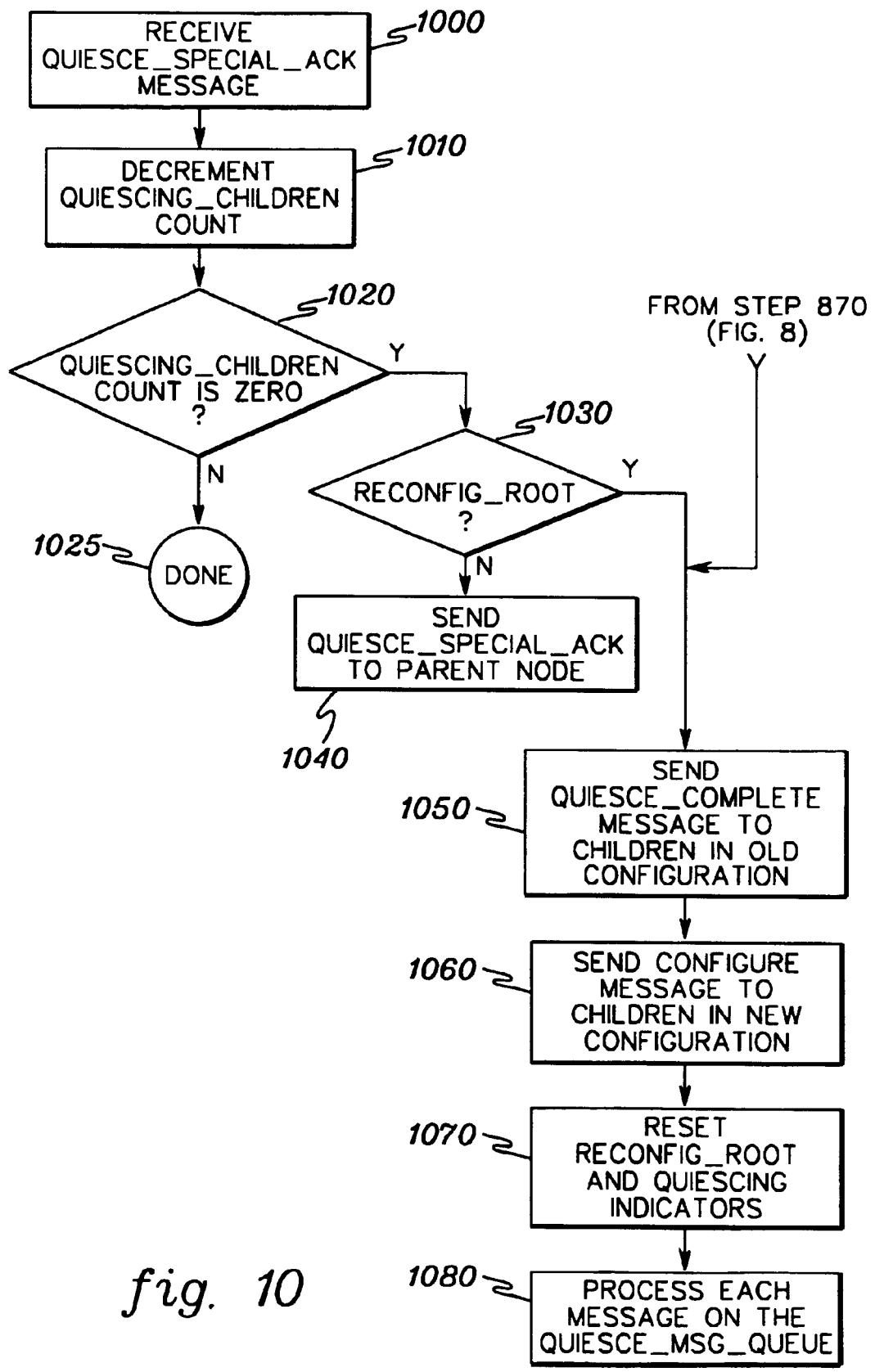
FIG. 10 is a flowchart of one embodiment of QUIESCE_SPECIAL_ACKNOWLEDGE message processing in accordance with the principles of the present invention.

One embodiment for processing the QUIESCE_SPECIAL_ACK message is depicted in FIG. 10. Upon receipt of a QUIESCE_SPECIAL_ACK message at a node 1000, the node decrements its QUIESCING_CHILDREN count 1010, and determines whether the QUIESCING_CHILDREN count is zero 1020. If no this processing is done 1025. Otherwise, the node determines whether it is the root node for the reconfiguration 1030. If "no", then a QUIESCE_SPECIAL_ACK message is sent to its parent node 1040.

If the root comprises the reconfiguration root, or if the node's QUIESCING_CHILDREN count equals zero (step 870 of FIG. 8), processing sends a QUIESCE_COMPLETE message to the node's children in the old configuration 1050. In addition, a CONFIGURE message is sent to the children in the new configuration 1060, and the RECONFIGURE_ROOT and QUIESCING indicators are reset 1070. The node then processes any messages in the QUIESCE_MSG_QUEUE 1080.

Figure 11:
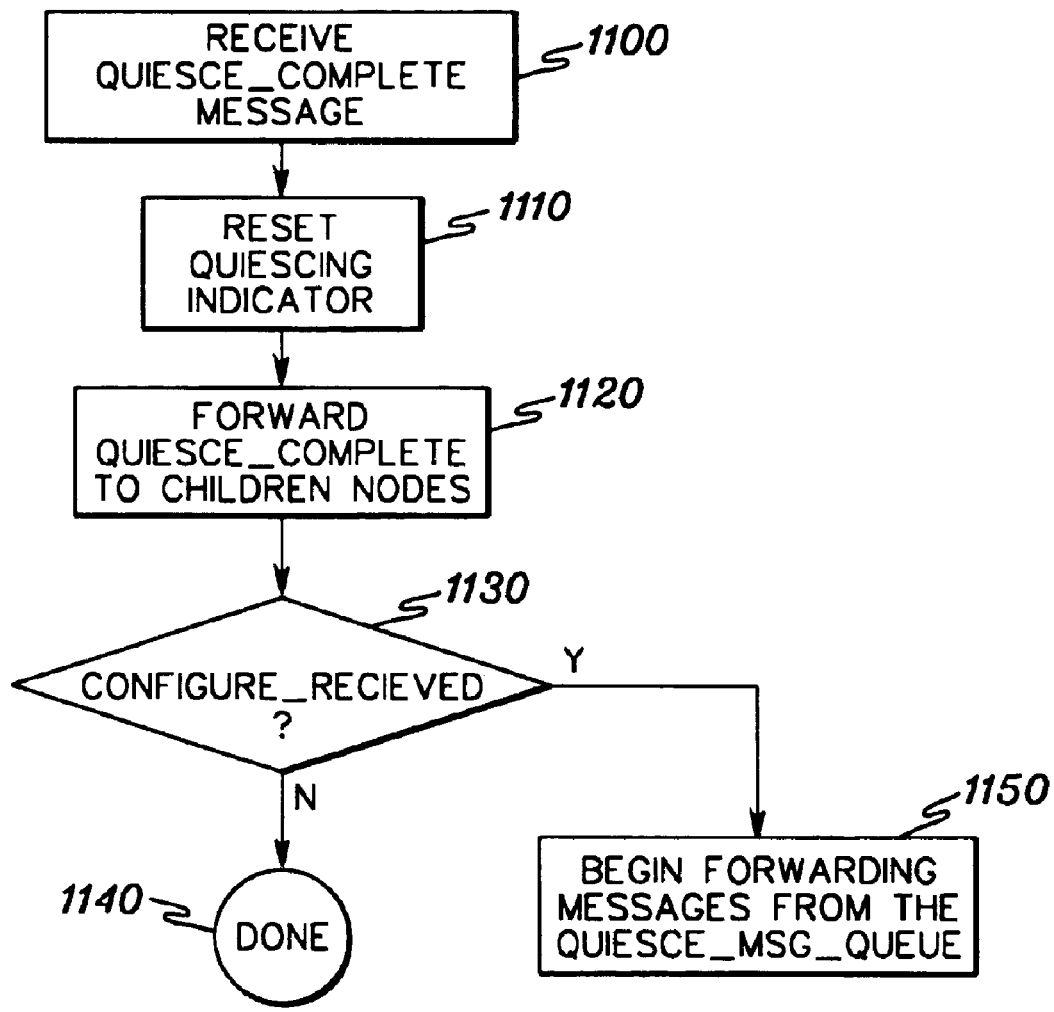
FIG. 11 is a flowchart of one embodiment of QUIESCE_COMPLETE message processing in accordance with the principles of the present invention.

FIG. 11 depicts one embodiment for processing a QUIESCE_COMPLETE message in accordance with the principles of the present invention. Upon a node's receipt of a QUIESCE_COMPLETE message 1100, the node resets the QUIESCING indicator 1110. The QUIESCE_COMPLETE message is then forwarded to its children nodes with respect to the current spanning tree 1120. The node inquires whether the CONFIGURE_RECEIVED indicator is set 1130 and, if not, processing is completed 1140. Otherwise, the reconfiguration is complete and the node begins forwarding any messages from the QUIESCE_MSG_QUEUE using the new spanning tree 1150.

Figure 12:
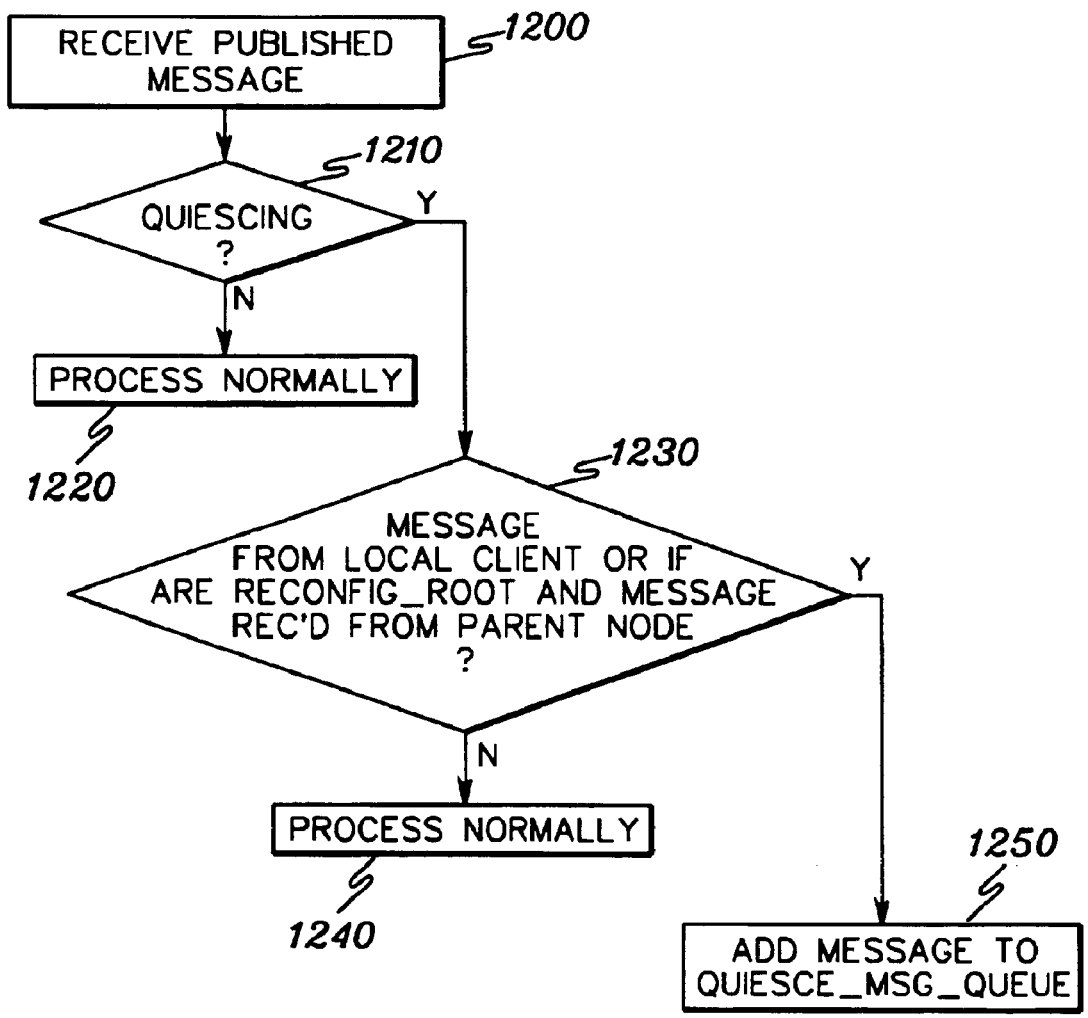
FIG. 12 is a flowchart of one embodiment for processing published messages in a routing network undergoing quiescent reconfiguration in accordance with the principles of the present invention.

FIG. 12 depicts one embodiment for processing published messages in accordance with the present invention. Upon receipt of a published message 1200, a node determines whether the QUIESCING indicator is set 1210. If "no", then the message is processed normally 1220. If in quiescing state, and the message is received from a local client or the current node is the reconfiguration root node and the message is received from a parent node, the message is added to the node's QUIESCE_MSG_QUEUE 1250. Otherwise, the message is processed normally 1240.

Those skilled in the art will note from the description provided herein that if configuration changes are confined to a sub-tree of the routing network, it is possible to confine the above-described processing to that sub-tree. In such a case, the root is the parent node of the sub-tree under which all configuration changes occur. If the sub-tree does not contain a logger/sequencer, it is not necessary to quiesce the logger/sequencers. In such a case, the control message quiescence phase may be skipped. If the sub-tree does contain logger/sequencer node(s), the logger/sequencer nodes within the sub-tree must be quiesced. So, the control message quiescence phase would be performed. Unlike the above description, data messages may be sent to the root by the parent of the root after data messages have been quiesced in the sub-tree. In this case, these data messages should be queued at either the root of the sub-tree, or at the logger/sequencer nodes (this would only be possible if a logger/sequencer maintained the same function in the new configuration). Logging acknowledgment or sequencing acknowledgment messages must not be sent in response to these data messages until after the network has been reconfigured.

Also, those skilled in the art will note from the description provided herein that if there are multiple spanning trees within the routing network and if configuration changes are required to more than one spanning tree, it is possible to extend the above-described processing to effect these changes simultaneously.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for reconfiguring a routing network, the routine network being part of a publish/subscribe system, the method comprising:
   quiescing the routing network to preserve a first-in first-out delivery order quality to clients of data messages within the routing network; and
   reconfiguring the quiesced routing network, while preserving the first-in first-out delivery order quality to clients of messages within the reconfigured routing network.

2. The method of claim 1, wherein said routing network comprises at least one of a logging network or a sequencing network, said logging network for logging a message to persistent storage within the routing network prior to delivery of the message to one or more clients of the network, and said sequencing network for sequencing a message at a node of the routing network with other messages received by the network prior to delivery of the message to one or more clients of the network, wherein the method further comprises quiescing control messages, the quiescing of control messages comprising quiescing any new logging acknowledgment message or sequencing acknowledgment message within said logging network or sequencing network, respectively.

3. The method of claim 1,
   wherein said quiescing comprises sending a quiesce message from a root node to all children nodes thereof using an existing routing network configuration.

4. The method of claim 3, wherein when a node of said routing network receives the quiesce message, the node begins queuing any new data messages received from a client thereof, forwards the quiesce message to any children nodes thereof, and sends a quiesce acknowledgment to its parent node, and wherein once the root node has received a quiesce acknowledgment from all children nodes, all data messages in a sub-tree defined from the root node have been quiesced.

5. The method of claim 1, wherein said reconfiguring is transparent to both publishers and subscribers of said publish/subscribe system.

6. The method of claim 1, wherein said routing network comprises a continuously available broker network.

7. The method of claim 1, wherein said quiescing comprises propagating a quiesce message from a root node across a spanning tree of said routing network, said quiesce message preventing any new data messages from being published for routing across said spanning tree.

8. The method of claim 7, wherein each node of said spanning tree responds to said quiesce message by sending a quiesce acknowledgment message to its parent node, and wherein after sending said quiesce acknowledgment message, any new data message received from a client of said node is queued at said node.

9. The method of claim 8, wherein said reconfiguring comprises sending a quiesce complete message from said root node to nodes of said spanning tree, wherein said spanning tree comprises an existing spanning tree configuration, and then sending a configure message to said nodes using a new spanning tree configuration, thereby accomplishing said reconfiguration.

10. The method of claim 7, wherein said quiescing of control messages comprises sending a quiesce special message from said root node to a special node of said routing network, said special node of said routing network comprising one of a logger node or a sequencer node.

11. The method of claim 10, wherein upon receipt of said quiesce special message at said special node, said special node returns a quiesce special acknowledgment message to said root node, and wherein upon receipt of said root node of said quiesce special acknowledgment message, said control messages within said routing network have been quiesced.

12. The method of claim 1, wherein said reconfiguring comprises reconfiguring said quiesced routing network transparent to any clients of said routing network, and wherein said routing network comprises one of a logging routing network wherein messages are logged for guaranteed delivery, or a sequencing routing network wherein messages are sequenced for ordered delivery.

13. The method of claim 12, wherein said network is part of a publish/subscribe system supporting content-based subscription, and wherein said method is used in combination with a method for routing messages within said routing network, said method for routing comprising routing a message to one or more clients of said network, said routing being based on data content of said message irrespective of any destination information that may be within said message.

14. The method of claim 13, wherein said routing comprises logging said message at at least one logging node within said network before delivering said message to said one or more clients of said network, said logging comprising storing said message in persistent storage.

15. The method of claim 12, further in combination with a method for routing messages within the routing network, said routing method comprising sequencing a message at a node of the routing network with other messages received by the routing network to produce an ordering of message delivery within the routing network, and delivering the message to one or more clients of the routing network while maintaining the ordering of message delivery.

16. A system for reconfiguring a publish/subscribe system comprising:
   a routing network adapted to receive published messages for forwarding to subscribers; and
   said network being further adapted to quiesce data messages and control messages within said network in response to a reconfigure command to preserve a first-in first-out delivery order quality to clients of data and control messages within the routing network, and to then reconfigure the routing network once data messages and control messages have been quiesced, while preserving the first-in first-out delivery order quality to clients of messages within the reconfigured routing network.

17. An article of manufacture comprising:
   at least one computer usable medium having computer readable program code means embodied therein for effecting reconfiguring of a routing network, the routine network being part of a publish/subscribe system, the computer readable program code means in the article of manufacture comprising:
   computer readable program code means for causing a computer to effect quiescing the routing network to preserve a first-in first-out delivery order quality to clients of data messages within the routing network;
   computer readable program code means for causing a computer to effect reconfiguring the quiesced routing network, while preserving the first-in first-out delivery order quality to clients of messages within the reconfigured routing network.

18. The article of manufacture of claim 17, wherein said publish/subscribe system includes at least one special node within said routing network, said at least one special node comprising one of a logging node or a sequencing node, wherein said logging node is employed to log messages to persistent storage, and said sequencing node is employed to sequence messages for ordered delivery.

19. The article of manufacture of claim 18, wherein said computer readable program code means for causing a computer to effect reconfiguring comprises computer readable program code means for causing a computer to effect reconfiguring the quiesced routing network transparent to both publishers and subscribers of said publish/subscribe system.

20. A system for reconfiguring a routing network, the routine network being part of a publish/subscribe system, the system comprising:
   means for quiescing the routing network to preserve a first-in first-out delivery order quality to clients of data messages within the routing network; and
   means for reconfiguring the quiesced routing network, while preserving the first-in first-out delivery order quality to clients of messages within the reconfigured routing network.

21. The system of claim 20, wherein said routing network comprises at least one of a logging network or a sequencing network, said logging network including a special logger node for logging a message to persistent storage within the routing network prior to delivery of the message to one or more clients of the network, and said sequencing network comprising a special sequencing node for sequencing a message within the routing network with other messages received by the network prior to delivery of the message to one or more clients of the network, wherein the system further comprises means for quiescing control messages, the means for quiescing control messages comprising means for quiescing any new logging acknowledgment message or sequencing acknowledgment message within the logging network or sequencing network, respectively.

22. The system of claim 20,
   wherein said means for quiescing comprises means for sending a quiesce message from a root node to all children nodes thereof using an existing routing network configuration.

23. The system of claim 22, further comprising means for queueing any new data messages received from a client of a node after the node receives the quiesce message, and for forwarding the quiesce message to any children nodes of said node, and for sending a quiesce acknowledgment to its parent node, wherein once the root node has received a quiesce acknowledgment from all children nodes, all data messages in a sub-tree defined from the root node have been quiesced.

24. The system of claim 20, wherein said means for reconfiguring comprises means for reconfiguring the quiesced routing network transparent to both publishers and subscribers of said publish/subscribe system.

25. The system of claim 20, wherein said routing network comprises a continuously available broker network.

26. The system of claim 20, wherein said means for quiescing comprises means for propagating a quiesce message from a root node across a spanning tree of said routing network, said quiesce message preventing any new data messages from being published for routing across said spanning tree.

27. The system of claim 26, further comprising means, at nodes of said spanning tree, for sending a quiesce acknowledgment message to its parent node in response to receipt of said quiesce message, and for queueing any new data message received from a client of said node after sending said quiesce acknowledgment message.

28. The system of claim 27, wherein said means for quiescing control messages comprises means for sending a quiesce special message from said root node to a special node of said routing network, said special node of said routing network comprising one of a logger node or a sequencer node.

29. The system of claim 28, further comprising means for returning a quiesce special acknowledgment message from said special node upon receipt of said quiesce special message, wherein said routing network has been quiesced upon receipt at said root node of said quiesce special acknowledgment message.

30. The system of claim 27, wherein said means for reconfiguring comprises means for sending a quiesce complete message from said root node to nodes of said spanning tree, wherein said spanning tree comprises an existing spanning tree configuration, and thereafter, for sending a configure message to nodes of a new spanning tree configuration, thereby accomplishing said reconfiguration.

31. The system of claim 20, wherein said means for reconfiguring comprises means for reconfiguring said quiesced routing network transparent to any clients of said routing network, and wherein said routing network comprises one of a logging network wherein messages are logged for reliable routing, or a sequencing network wherein messages are sequenced for ordered delivery.

32. The system of claim 31, further in combination with a system for routing messages within the routing network, said routing system comprising means for sequencing a message at a node of the routing network with other messages received by the routing network to produce an ordering of message delivery within the routing network, and means for delivering the message to one or more clients of the routing network while maintaining the ordering of message delivery.

33. The system of claim 31, wherein said network is part of a publish/subscribe system supporting content-based subscription, and wherein said system is used in combination with a system for routing messages within said routing network, said system for routing messages comprising means for routing a message to one or more clients of said network, said means for routing being based on data content of said message irrespective of any destination information within said message.

34. The system of claim 33, wherein said means for routing comprises means for logging said message at at least one logging node of said network before delivering said message to said one or more clients of said network, said means for logging comprising means for storing said message in persistent storage.

* * * * *